United States Patent [19]

Swarup

[11] 4,439,296

[45] Mar. 27, 1984

[54] METHOD FOR REPAIRING PERFLUORINATED POLYMERIC MICROPOROUS ELECTROLYTIC CELL SEPARATORS BY HEAT SEALING

[75] Inventor: Rajeshwar Swarup, Williamsville, N.Y.

[73] Assignee: Occidental Chemical Corporation, Niagara Falls, N.Y.

[21] Appl. No.: 316,198

[22] Filed: Oct. 29, 1981

[51] Int. Cl.³ .................. C25B 9/00; C25B 13/02; C25B 13/08; H01M 2/16
[52] U.S. Cl. .................................. 204/253; 204/296; 429/250
[58] Field of Search ............... 204/296, 252–258; 429/250

[56] References Cited

U.S. PATENT DOCUMENTS

| | | | |
|---|---|---|---|
| 4,153,530 | 5/1979 | Vallance et al. | 204/252 |
| 4,156,639 | 5/1979 | Vallance et al. | 204/252 |
| 4,165,248 | 8/1979 | Darlington et al. | 204/296 X |
| 4,191,627 | 3/1980 | Specht | 204/296 |
| 4,252,878 | 2/1981 | Lazarz et al. | 429/250 |
| 4,263,121 | 4/1981 | Christensen | 204/296 |
| 4,283,264 | 8/1981 | Darling et al. | 204/252 |
| 4,329,217 | 5/1982 | Byrd et al. | 204/296 X |

*Primary Examiner*—Donald R. Valentine
*Attorney, Agent, or Firm*—James F. Tao; William G. Gosz

[57] ABSTRACT

Microporous separators for electrolytic cells are fabricated from multiple fluoropolymer panels joined and sealed together so as to conform with cell geometry. Improved, leak-free seals are made in the case of chemically treated separators by applying a non-melt processable perfluoroalkylene polymer sealant between separator joints which are then sealable by application of heat and pressure. Only damaged sections or "worn" panels of cell separators need be replaced by resealing new panels to previously heat sealed edges of non-damaged separator sections by application of the polymer sealant. The sealant is one having melting or fusing temperature which is at least substantially equivalent to the melting or fusing temperature of the polymeric microporous separator.

4 Claims, 4 Drawing Figures

METHOD FOR REPAIRING PERFLUORINATED POLYMERIC MICROPOROUS ELECTROLYTIC CELL SEPARATORS BY HEAT SEALING

BACKGROUND OF THE INVENTION

The present invention relates generally to improved asbestos-free porous polymeric sheet materials which are suitably patterned into separators for use in electrolytic cells, such as chlor-alkali cells and other types of liquid - liquid processing apparatuses like fuel cells, osmotic cells, diffusional cells, and the like. More particularly, the invention is concerned with microporous polytetrafluoroethylene (PTFE) in sheet form patterned into individual panels when bonded together with an intermediate non-melt processable perfluoroalkylene polymer layer/coating, produces stronger more reliable seals. It has been observed that statistically there are fewer occurrences of joint separation and separator failure when PTFE panels are sealed according to the disclosed invention.

Diaphragm cells have long been used for the manufacture of chlorine and caustic soda. In such cells, anolyte and catholyte have been previously separated by a diaphragm of deposited asbestos fibers, usually on a wire mesh cathode structure. In recent years however, such diaphragms in some instances have been replaced by ion-permeable membranes or porous separators. Of the porous separators, those which are microporous and made, for example, from PTFE are gaining increased favor, primarily for reasons of environmental safety, lower electrical power consumption, and lower cell maintenance costs.

Because polymeric separators are in most instances produced in sheet form and are not deposited onto wire mesh cathode structures, as in the case of a deposited asbestos diaphragms various methods have been suggested for retrofitting separator sheets onto such cathode structures. For example, U.S. Pat. No. 4,076,571 teaches restoration of elasticity to heat sealed portions of an electrolytic diaphragm, including the formation of an envelope by heat sealing together sections of diaphragm material at edges thereof. In the installation of such a diaphragm, an envelope is formed of the diaphragm material and slipped over an electrode, after which the envelope is closed by clamping means. U.S. Pat. No. 4,283,264 is a further example of a porous PTFE material retrofitted onto a chlor-alkali cell wherein a plurality of open ended tubular panels of a height greater than the cell cathodes are equipped with polymer flange portions at one or both ends of the panels. The anode compartments of the cell are sealed off from the cathode compartments by bonding adjoining halves of two adjacent separator tubes or panels by heat sealing their flanges together. Alternatively, U.S. Pat. No. 4,283,264 suggests that multiple tubular panels be joined together by means of an added peripheral polymeric sealing member by bonding the flanges of the tubular panels thereto. The peripheral sealing members in turn are held tightly in place by gaskets to prevent leakage between anolyte and catholyte compartments of the cell. Regardless of embodiment, the fitting of an electrolytic cell with polymeric microporous separators invariably requires multiple PTFE panels precut to fit the particular cell geometry or cathode configuration where the edges of such panels are bonded together, typically by forming lap joints or where edges of separator panels are butted up to each other and sealed by the application of heat and pressure.

Most applications for microporous separators, and especially in the case of electrolytic cell applications allow virtually no tolerance for seals which after a period of time begin to leak. It has been applicant's experience that even a relatively small separation of a sealed joint holding together separator panels will adversely affect cell performance in terms of lower current efficiencies, higher power consumption, as well as deterioration of product purity and concentration. Consequently, a key element to the successful conversion of an asbestos diaphragm cell to a non-asbestos containing PTFE microporous separator equipped cell lies in making highly reliable seals for bonding separator panels together.

Heretofore, various methods have been proposed for sealing PTFE panels. For example, U.S. Pat. No. 4,156,639 discloses the formation of an "endless-belt diaphragm" fabricated from multiple strips of fluorine-containing polymers. In a preferred embodiment, a porous PTFE separator is bonded to a "window frame" sheet comprised of melt-processable fluorine-containing polymer strips, such as fluorinated ethylene/propylene copolymer. A belt is formed by joining two such frames together by means of lap joints bonded together by hot pressing the joint or by the application of a cement such as a low molecular weight, low melting point PTFE. A method similar to that of U.S. Pat. No. 4,156,639 is also disclosed in U.S. Pat. No. 4,153,530 whereby porous PTFE separator panels are connected onto upper and lower slotted supports by means of melt-processable fluorine-containing polymers.

U.S. Pat. No. 4,263,121 provides for making fluid impermeable seals for microporous separators by sealing the edges of separator panels with fluorinecontaining polymers. The sealing polymer should be a fusible substance and though it may be of the same chemical composition as the separator, it is essential that the fusible material be chemically and/or physically more readily fused than the separator material. Embodiments include porous PTFE separator panels bonded together with PFA and FEP both of which have lower melting temperatures than PTFE and are melt-processable.

Another process for sealing microporous separators is disclosed by U.S. Pat. No. 4,165,248 whereby microporous diaphragms are welded together by means of fluorocarbon polymer positioned as an intermediate material in the joint. However, before sealing the fluorocarbon material is treated with a strong base to cause a swelling action. Thereafter, the edges of the diaphragms and intermediate material are bonded together by application of heat and pressure.

The previously described processes for sealing microporous PTFE sheet materials, particularly for chlor-alkali cell applications, have a number of shortcomings. Early methods were not convenient or were commercially impractical or lacked reliability in terms of leak free performance over extended time periods. For example, more conventional melt-processable, thermoplastic sealant materials which are either only partially fluorinated or non-fluorinated tend to have shorter life expectancies, particularly when operating in the highly corrosive environment of a chlor-alkali cell over prolonged time periods. Furthermore, perfluorinated hydrocarbon separators, like PTFE, when fabricated from several preformed pieces and welded together to form a diaphragm sleeve or envelope, in addition to being costly in terms of manhours required for assembly, also presents a statistically greater risk of separator failure due to joint separation and leakage.

In addition to the foregoing disadvantages associated with earlier methods of bonding cell separators, previous efforts failed to address the problem of repairing damaged, defective or renewing "worn" porous PTFE cell separators without necessarily refitting the entire cell. Perfluorinated polymers like PTFE also have hydrophobic properties and in order to employ such materials in electrolytic cells they first must be made hydrophillic. Thus, PTFE separator materials are in some instances treated with chemical agents. One example of chemical treatment of fluorocarbon separators is disclosed in U.S. Pat. No. 4,252,878 (C. A. Lazarz, et al) wherein the separator surfaces are coated with fluorinated surface active agents. Such agents effectively impart wettability properties to separator sheets, but such treatments do require new methods for bonding, since previous methods for joint welding fail to provide fail-safe seals to PTFE surfaces coated with films.

Accordingly, it has now been discovered that damaged or defective panels of perfluorinated polymeric separators may be renewed by welding replacement panels to the operative and usable sections of the separator by joining and sealing said panels to separator edges which have been previously sealed by application of heat and pressure. In addition, dependable, leak-free seals can now be made in those circumstances where polymeric cell separators have been coated during manufacturing. Seals are formed by placing non-melt processable perfluoroalkylene polymer sealant between separator panels and bonding the panels together by the application of heat and pressure. In practice, the intermediate polymer is usually the same chemical composition as the separator material and will have substantially the same melting and fusing properties as the polymer panels being sealed. That is to say, the sealant may be comprised of non-porous polymer strips cut from sheet material, as well as porous polymer strips made from microporous separator sheets.

Accordingly, it is a principal object of the present invention to provide a means for sealing panels of perfluorinated polymeric materials into microporous separators wherein their seals exhibit the strength and dependability needed for long term operations for electrolytic cell applications.

A further object of the immediate invention is solution to the problem of resealing edges of perfluorinated materials which were previously sealed under heat and pressure and subsequently broken.

A still further object of the present invention is the fabrication of perfluorocarbon microporous separators by bonding together individual panels treated and coated with films and chemical agents.

These and other objects, features, and advantages will become apparent to those skilled in the art after a reading of the following more detailed description.

PREFERRED EMBODIMENTS OF THE INVENTION

Broadly, the invention relates to perfluorinated thermoplastic polymers in the form of porous sheet materials most suitably patterned into preshaped panels when bonded together according to the method herein described are useful as diaphragms or separators for electrolytic cells, typically chlor-alkali cells, fuel cells and the like.

More specifically, the instant invention provides a reliable means for joining and bonding said separator panels together to form gas - liquid tight, leak-free seals with statistically fewer failures resulting from seal separation. The invention involves the steps of contacting a first porous PTFE separator panel, most preferably an edge with a fluorine-containing polymer sealant, said sealant being a non-melt processable perfluoroalkylene polymer. A joint is formed by contacting the edge of the first separator panel having sealant with a second PTFE separator panel. The first and second separator panels are sealed together by the application of heat and pressure to the joint in an amount sufficient to form a leak-free bond.

The sealants for purposes of the present invention are comprised of non-melt processable perfluoroalkylene polymers, preferably lower alkylenes in the range of 2 to 4 carbon atoms.

Within the invention are cell separator envelopes comprised of one or more PTFE panels joined together so as to fit the interior configuration of the cell encasing the cell's anodes or cathodes. The envelopes may also be fastened to the cell structure by separator flanges sealed to peripheral sealing or gasketing members for a most effective leak-free sealing and separation of cell components. Damaged or defective separator panels encasing the electrodes may be replaced by breaking the seals of welded joints and new panels installed by joining and bonding to the same edges of the useable sections of the separator.

The invention also encompasses sealing porous PTFE separators treated or coated with films whereby leak-free joints are made by the insertion of an intermediate layer of polymer sealant and bonding by the application of heat and pressure.

The invention will be readily understood from the accompanying description in the specification, taken together with the drawings in which.

Figure 1:
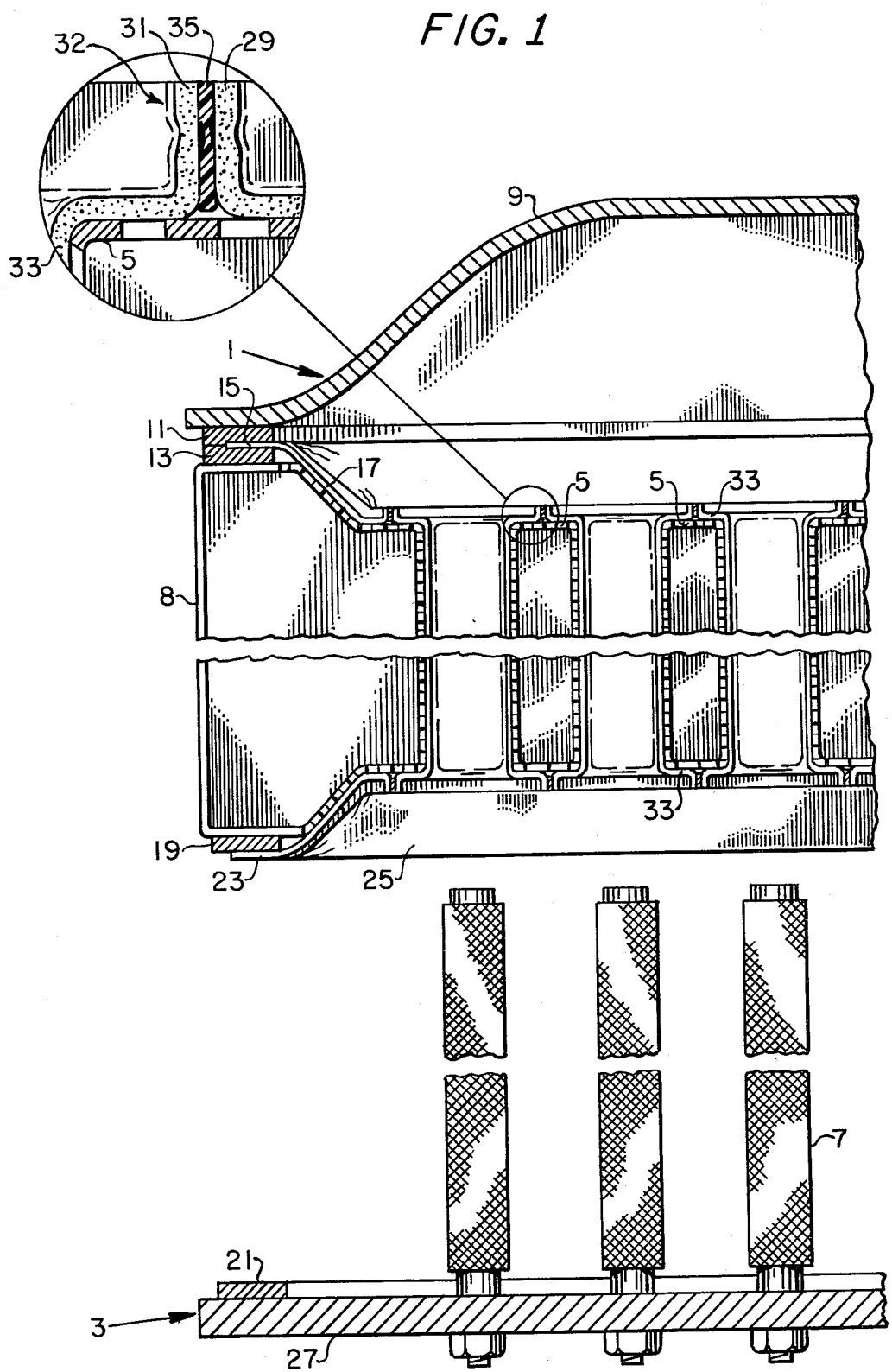
FIG. 1 is a disassembled partial vertical sectional view of a chlor-alkali cell with one sealed joint of the separator enlarged.

FIG. 1 illustrates one embodiment of a partially assembled electrolytic cell having upper and lower cell sections 1 and 3, respectively. Cathodes 5 and side-walls of the cell collectively form the cathode can 8 all above anodes 7, the latter of which are affixed to cell base 27. The upper cell section 1 includes a cell cover 9 which rests on sealing gaskets 11 and 13. An upper peripheral sealing flange 15 which is an extension of microporous cell separator 33 and peripheral separator material 17 is positioned between gaskets 11 and 13, said sealing flange also shown in FIG. 4. A lower peripheral sealing flange 23 an extension of peripheral separator material 25 is positioned between sealing gasket 19 and gasket 21 of the lower cell section, so when the cell is closed by sealing means, not illustrated, base 27 and cover 9 at their peripherie are compressed towards each other, making effective peripheral seals with said gaskets. The anolyte is thereby maintained separate from the catholyte by the present separators.

Porous cell separator sheets 33 are preferably manufactured from perfluorinated polymers, such as PTFE when used in chlor-alkali cells. Because reference is made principally to polytetrafluoroethylene (PTFE), it should be recognized this is for convenience purposes only, and accordingly, should not be construed as necessarily restrictive to the scope of polymers which may be employed in meeting the objectives of the invention. Although a wide range of thermoplastic polymers are known to have suitable properties for use as cell separators, fluorine containing homo and co-polymers appear best suited. Therefore, in addition to polytetrafluoroethylene, other satisfactory fluoropolymers include polyvinyl fluoride, polyvinylidene fluoride, polychlorotrifluoroethylene, polyfluoroethylenepropylene, polyfluorolower alkoxyethylene, and copolymers like chlorotrifluoroethylene and ethylene. In addition thereto, the physical properties of the polymeric microporous cell separators and methods to achieve high performance in electrolytic cells in terms of current efficiencies and lower cell voltages which are at least equivalent to the most energy efficient deposited separators, e.g. . . . asbestos, have been defined by U.S. Pat. Nos. 4,250,002; 4,170,540; 4,289,600; 4,252,877; and 4,292,146. Methods of retrofitting microporous separator panels for use in electrolytic cells have been disclosed in U.S. Pat. No. 4,283,264; the contents of each of said patents is hereby incorporated-by-reference herein.

Sections of separator 33 are joined and sealed at their edges 29 and 31 forming butted joint 32 by inserting a strip of non-melt processable perfluoroalkylene polymer sealant 35 longitudinally between said separator edges.

The sealant, as previously stated, comprises a non-melt processable perfluoroalkylene polymeric composition. However, it has been found that the most dependable leak-free seals are those made wherein the sealant is comprised of the same polymeric material used in manufacturing the separator sheets. The polymer sealant should preferably also possess substantially the same crystalline melting or fusing properties as the separator material. Thus, for example, microporous separators comprising PTFE would preferably utilize a non-melt processable fully perfluorinated PTFE material which has the same or virtually the same melting or fusing properties as the separator panels. Small or minor variations in the melting or fusing temperatures between the separator material and the polymer sealant nevertheless have been noted, and although uncertainty does exist as to the exact reason for such variations, they are believed to have resulted from the PTFE used in separator manufacturing being subjected to high shear and stress forces for imparting "work" to the material during blending and milling of the separator dough. This along with lengthy drying and sintering cycles are believed to account for the minor variations between the PTFE based separator and the PTFE sealants' fusing or melting temperatures in some instances. Naturally, in those instances where the polymer sealant employed is made from strips of polymeric separator per se interposed and bonded between separator edges, the melting or fusing temperatures of both separator and sealant expectedly would be the same. But, in those instances where the PTFE polymer sealant is a virgin PTFE material some small variation in fusing or melting temperatures may be expected.

It has been found that dependable, high strength seals are made when the polymer sealant has a thickness ranging from about 15 to about 50 mils, and a width of about 0.25 inches. Polymer sealant in the form of thin films were found to be less reliable. Likewise, excessively thick polymeric strips require longer heating periods to fuse the sealant to separator edges, and provide no added benefit in terms of greater seal strength. Wider sealant strips, e.g. . . . up to 0.5 inch and concomitant wider joints can be utilized, but in some instances do interfere with narrowing the anode-cathode clearances or gaps which are desirable for lower cell voltages.

The step of welding the joint to "permanently" bond separator edges 29 and 31 under heat and pressure may be carried out using established methods and equipment known to persons skilled in the art. Variables of temperature and time in heat sealing joints according to the immediate invention should be taken into consideration. Dependable, high strength seals require the polymer sealant to at least reach its crystalline melting temperature, so as to fuse with separator edges. Thus, the temperature of the heating element of the sealer in the case of a PTFE separator and PTFE sealant combination may be as low as 340° C. and may also be as high as 480° C. In practicing the invention at the upper temperature range it is quite possible to degrade the polymer and weaken the seal. Therefore, when operating at the upper end of the temperature range shorter heat sealing times would be used than when sealing at lower temperatures.

As previously indicated in connection with FIG. 1, assembly of the cell is completed by lowering the upper cell section 1 onto the lower cell section 3 wherein base 27 and cover 9 form a liquid tight seal around the cell periphery. The assembled cell has its anodes 7 and cathodes 5 in alternating relationship. But, because of very close tolerances between anodes and cathodes in state of the art cells for lowest cell voltages and reduced power consumption, the assembly process can result in tearing, cutting or abrasion to separator surfaces. Typically, surfaces of anodes 7 are made from coated expanded metal screening or wire meshes commonly referred to as dimensionally stable anodes. Such anodes have sharp edges which raise the potential for damage to separator panels during final cell assembly. The risk of damage to polymeric type separators may be in some instances greater than with vacuum deposited asbestos diaphragms because the former do not adhere as tightly to cathode sidewalls. Consequently, the lack of extra clearance space between anodes and separator surfaces during assembly can be troublesome. In the event of a damaged separator repair of panels may be carried out according to the present invention with minimal expense and downtime. Instead of installing an entire new separator, only the damaged or defective panels are replaced by breaking the heat seals of such separator panels and new panels installed in their place. Because previously heat sealed edges of perfluorinated polymeric separators do not provide adequate strength when resealed with heat and pressure, it was discovered that placement of the intermediate polymeric sealant previously described overcomes the inherent weakness in the joints.

Figure 2:
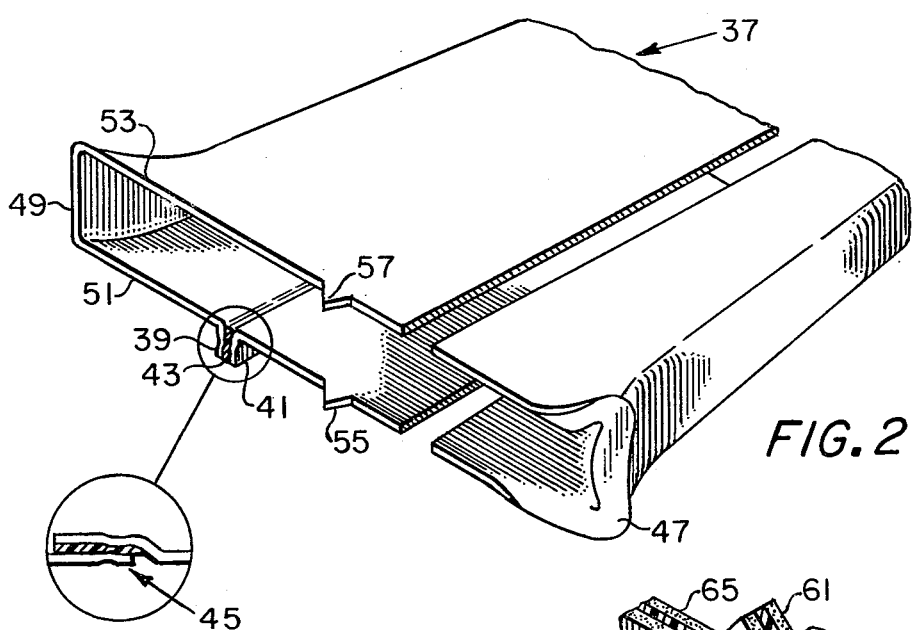
FIG. 2 is a perspective view of a separator panel having expanded flanges at one end, the envelope panel being sealed by butted or lap joint, the latter joint being illustrated in the enlarged section.

Thus, FIG. 2 illustrates separator envelope panel 37 used in the cell assembly of FIG. 1 has edges 39 and 41 butted together and bonded by means of intermediate polymer sealant 43. The separator edges may also be bonded in the form of a lap seal 45. Panel 37 shows only one end having an envelope flange 47, but in practice both ends of such envelope may be equipped with such flanges. Edges 49, 51 and 53 illustrate the flange before being folded. Dimensionally, panel 37 will be of sufficient height that it extends beyond the upper and lower edges of the cathode. Two half-envelopes 37 may be joined together at the top and bottom of each cathode member by such flanges which are then heat sealed. This can be more clearly observed in FIG. 1. Each of the cell cathodes 5 are encased by heat sealing half sections of separator envelope panel 37 together which if damaged can be replaced according to the method herein described.

Figure 3:
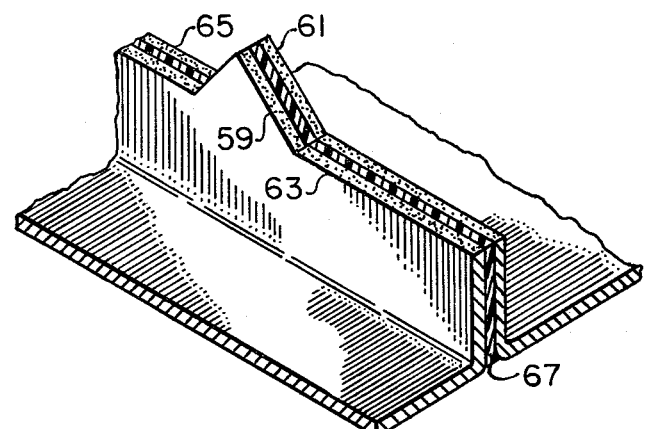
FIG. 3 is an enlarged partially sectioned perspective view of an end of a separator envelope aligned with indicator points and sealed with an intermediate polymer sealant strip.

FIG. 3 illustrates an enlarged partial sectional view of two half separator envelope panels with butted joint sealed together at the top and/or bottom of the cell cathode. Indicator points 59 and 61 aid in aligning the edges of the halfpanels 63 and 65 together for smooth fit without creating folds or wrinkles in the separator material during installation. Non-melt processable perfluoroalkylene polymer sealant 67 placed between the joint is used for resealing the same joint after one or both of such panels have been replaced.

Figure 4:
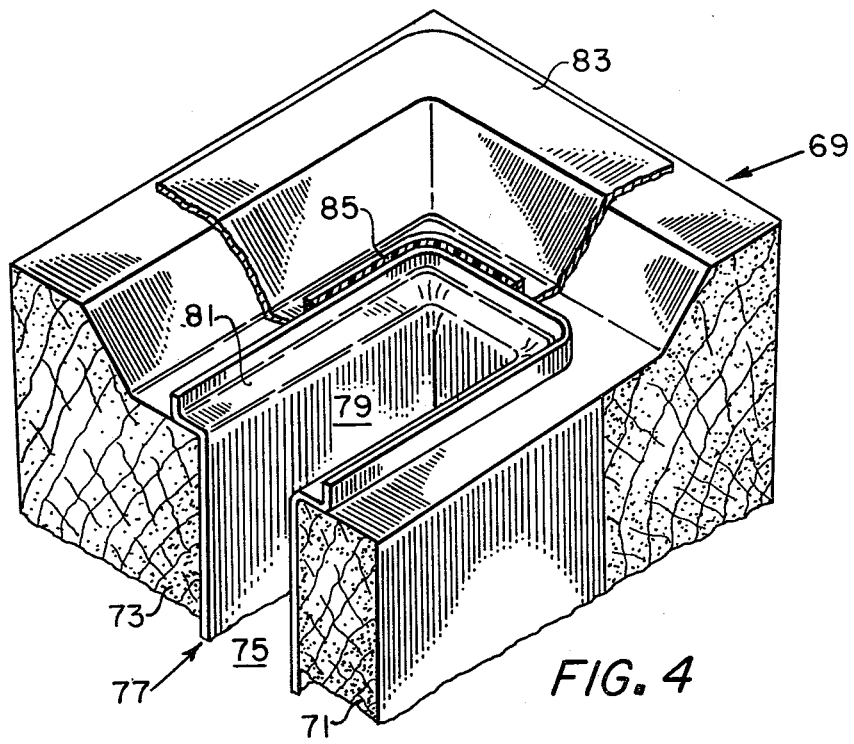
FIG. 4 is a perspective view of a portion of separator envelope sealed to additional gasketing or sealing member on an assembly form.

FIG. 4 provides a further partial view of a PTFE microporous separator being assembled on wooden assembly form 69, prior to retrofitting to a diaphragm-type chlor-alkali cell. In this instance, separator envelope panels 77 having tubular section 79 and flange 81 is placed in form opening 75 between vertical members 71 and 73 and heat sealed to peripheral sealing flange 83 by placement of polymeric sealant 85 longitudinally between flanges 81 and 83. Use of the non-melt processable polymer sealant in assembly of new cell separators has been found especially advantageous when separator sheet material has been pretreated with chemical agents which make conventional heat sealing techniques impractical, e.g. . . .wetting agents, such as those described in U.S. Pat. No. 4,252,878.

The following specific examples demonstrate the process of the instant invention, however, it is to be understood that these examples are for illustrative purposes only, and do not purport to be wholly definitive as to conditions and scope.

EXAMPLE I

PART A

Multiple sheets of microporous separator were made according to the method described in U.S. Pat. No. 4,170,540 from materials consisting of powdered PTFE, calcium carbonate pore forming agent, and Zonyl ® FSN brand as lubricant additive. After milling, drying, sintering, leaching and washing, the dimensions of each of the sheets was determined to range from between 80 and 100 inches length, about 32 inches in width and an average thickness of about 60 mils. The microporous separator sheets had no chemical wetting treatment or other surface films applied either during or after manufacturing. The ends of two of such sheets were joined together to form a 0.25 inch wide butted joint which was sealed under heat and pressure using a double element heat sealer supplied by Roemac Industrial Sales (N. Tonawanda, New York). The heat sealer was equipped with heating elements 8 inches in length and 0.25 inches in width mounted on opposing vice grip jaws which were adjustable to modify jaw closure pressure. The heat sealer was equipped with 3 KV generators supplying from 20 to 80 amperes current at 3 to 5 volts, and included a timer to adjust the heating and cooling cycles. The butted edge was heat sealed for about 22 seconds at a temperature setting of between 460° to 480° C. The heater cycled off for gradual cooling at the end of the heating cycle for a few seconds and the jaws were opened. The total length of the two sealed separator sheets was about 162 inches.

Ends of the sealed separator sheet were folded over and joined to form a butt-type seal and bonded together under heat and pressure according to the foregoing procedure, so as to form an oval shaped envelope panel. The panel was labeled Sample No. 1.

The bonded joints of Sample No. 1 were tested for peel strength using an Instron tensile strength testing apparatus, model TTC, serial number 1790, manufactured by the Instron Corp., Canton, Mass. A determination was made that a satisfactory heat seal for separator panels bonded together for use in a chlor-alkali cell is one demonstrating a minimum peel strength of 3 lbs./0.5 inch sample at break. Peel strength data for Sample No. 1 is shown below in Table I.

PART B

The process described in Part A (Example I) was repeated in order to make a second PTFE microporous separator sheet of approximately the same dimensions. The sheet was folded and heat sealed under the same conditions of temperature and pressure as used in Part A forming an oval shaped envelope panel. However, a seal on the envelope was broken by hand peeling. After separation of the separator edges, the same edges were rejoined and resealed utilizing the same heating cycles and pressure applied in making the original seal. The separator was labeled Sample No. 2 and the resealed joint tested for peel strength.

PART C

A third separator envelope was fabricated following the procedure of Example I, Part B, which included breaking an orginal envelope seal. But, instead of immediately resealing the broken joint, a non-porous PTFE (supplied by Fabriton, Inc. Alden, New York) strip having a thickness of 30 mils and a width of about 0.4 inches was placed between the two broken edges of the broken envelope seal and resealed using the same heating element temperatures and pressures used in making the original seals, except the length of the heat cycle was increased by employing two 22 second heat applications interrupted by a 9 second cooling cycle to avoid scorching or burning the separator material. This separator panel was labeled Sample No. 3 and tested for peel strength.

PART D

A further microporous PTFE envelope panel was fabricated according to the method previously described. Both heat seals of the envelope were broken by hand peeling and a new PTFE separator panel not previously heat sealed was joined with a broken edge of one of the previously heat sealed panels. A butted joint was made by heat sealing the joint using the same pressure and heating temperatures—cycles used in making the original joint. The separator panel was labeled Sample No. 4 and the resealed joint tested for peel strength.

PART E

A fifth PTFE separator envelope was prepared according to the method of Part D, Example I, except before heat sealing an edge of the replacement panel to the edge of the panel previously heat sealed and then broken, a strip of solid uncoated PTFE having a thickness of about 30 mils was inserted between the edges of the separator and sealed under heat and pressure. The length of the heating cycle was increased by employing two 22 second heat applications interrupted by a 9 second cooling cycle to avoid burning the separator material. The separator panel was labeled Sample No. 5 and tested for peel strength.

TABLE I

Peel Strengths PTFE Heat Seals

| Sample No. | Seal | *Peel Strength Pounds/0.5" Sample at break |
|---|---|---|
| 1 | Porous PTFE to Porous PTFE | 3.13 |
| 2 | Porous PTFE to Porous PTFE, seal broken and resealed (no polymer sealant) | 1.84 |
| 3 | Porous PTFE to Porous PTFE, seal broken and resealed with intermediate 30 mil PTFE strip | 6.23 |
| 4 | Porous PTFE to Porous PTFE; seal broken and replacement PTFE panel resealed to broken edge (no polymer sealant) | 2.8 |
| 5 | Porous PTFE to Porous PTFE; seal broken and replacement panel resealed to broken edge with intermediate 30 mil PTFE strip | 9.1 |

*Average of 4 samples

Table I demonstrates that joints of sufficient strength can be made by sealing virgin sheets of porous PTFE together under heat and pressure. However, in the event of an occurrence of joint separation resealing the same broken edges under heat and pressure without polymer sealant will not provide seals of sufficient peel strength. Use of an intermediate polymer strip provides seals having high tensile strength, so that resealing the original joint or employing a replacement panel can be achieved without refitting the entire cell separator.

EXAMPLE II

PART A

Multiple sheets of microporous separator were made according to the method described in U.S. Pat. No. 4,017,540 from materials consisting of powdered PTFE; calcium carbonate pore forming agent and Zonyl® FSN lubricant. After milling, drying, sintering, leaching and washing the sheets were treated to make them hydrophillic to chlor-alkali cell electrolyte by treating with a 3% solution of Zonyl FSN fluorosurfactant, according to the method described in U.S. Pat. No. 4,252,878. The microporous PTFE sheets having said surface treatment were then wettable to aqueous solutions of alkali metal chloride brines.

The treated microporous separator sheets were joined together to form a separator envelope panel by butting one edge to the other and sealing under heat and pressure employing a double element heat sealer of the type described in Example I. The heating element operated at a temperature range of between 460° and 480° C. at 22 second heating cycles. The separator envelope was labeled Sample No. 1 and tested for peel strength. Peel strength data for Sample No. 1 is shown below in Table II.

PART B

Microporous PTFE cell separator envelope was made according to the method of Example II, Part A, also having a surface treatment with Zonyl® FSN fluorosurfactant. However, before sealing the butted joints under heat and pressure a 0.5 inch wide strip of non-porous PTFE material having a thickness of about 30 mils was placed between the edges of the separator material. The non-porous PTFE strip was a virgin material having no chemical treatment or coating on its surface. The crystalline melting temperature of the PTFE strip was found to be 332° C. as determined by differential scanning colorimetry (DSC) using a model DSC-2 manufactured by Perkins Elmer Corp. The separator material itself was found to have a crystalline melting temperature of 333.5° C. The sealed joint of the separator envelope was labeled Sample No. 2 and tested for peel strength.

Peel strength data for Example 2 is provided in Table II.

TABLE II

Peel Strength - Coated PTFE Heat Seals

| Sample No. | Seal | *Peel Strength Pounds/0.5" Sample at break |
|---|---|---|
| 1 | Porous PTFE to Porous PTFE | 1.38 |
| 2 | Porous PTFE to Porous PTFE with PTFE strip | 3.04 |

*Average of 4 samples tested on Instrom (model TTC by Instrom Corp., Canton, Mass.), Cell D, cross head speed 2"/min., 1¼" jaw opening While the invention has been described in conjunction with specific examples thereof, this is illustrative only. Accordingly, many alternatives, modifications and variations will be apparent to those skilled in the art in light of the foregoing description, and it is therefore intended to embrace all such alternatives, modifications, and variations as to fall within the spirit and broad scope of the appended claims.

What is claimed is:

1. A method for repairing electrolytic cell separator panels, said electrolytic cell comprising a plurality of anodes and cathodes in alternating arrangement separated by a PTFE microporous separator into anolyte and catholyte compartments, said separator being formed by joining and heat sealing together a multiplicity of separator panels encasing the anodes or the cathodes and being fastened to the cell structure by means of a flange at an end thereof, the method comprising (a) removing only defective or damaged panel(s) of the separator by breaking their heat seals, and (b) installing replacement panel(s) by joining the same to the edge(s) of the broken heat seals of the remaining non-defective/damaged panels of the separator to form new panel joints, said panels being affixed together by means of a PTFE sealant strip located between the panel joints and sealed by the application of heat and pressure.

2. The method of claim 1 wherein the replacement panel (s) are pretreated with a fluorinated surface active wetting agent before installation.

3. The method of claim 1 wherein the PTFE sealant strip is non-porous.

4. The method of claim 1 wherein the PTFE sealant strip is porous.

* * * * *